W. KIELING.
INTERNAL COMBUSTION ENGINE WITH ROTATING CYLINDERS.
APPLICATION FILED AUG. 20, 1912.

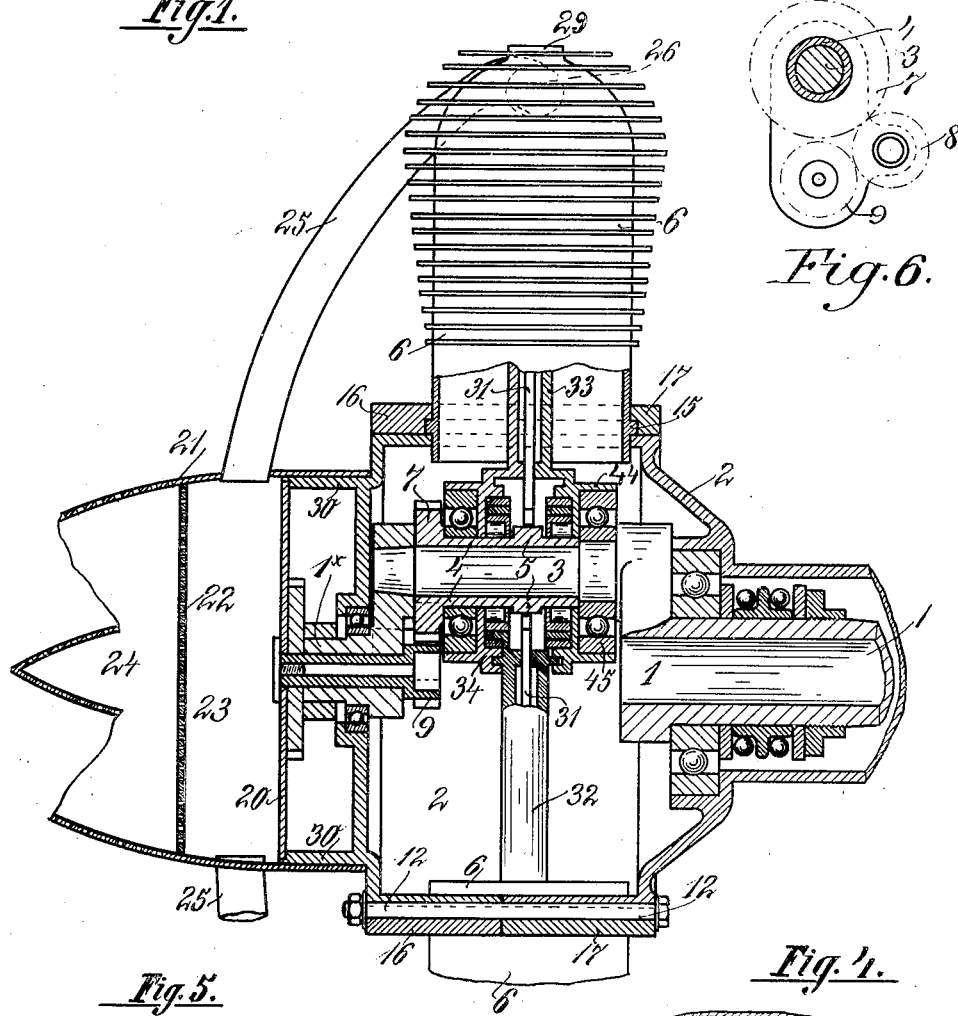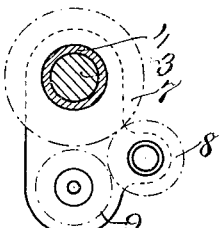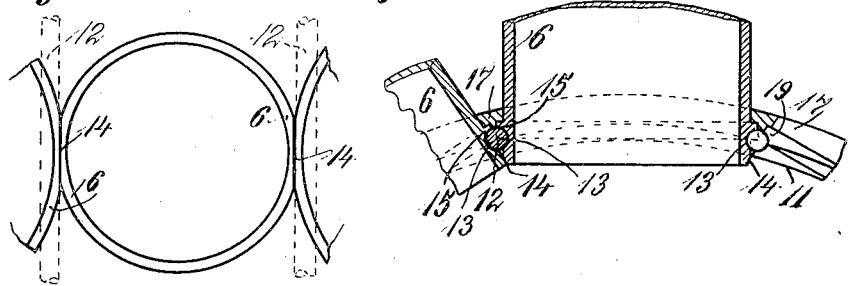

1,191,437.

Patented July 18, 1916.
4 SHEETS—SHEET 2.

Witnesses:
John H. Hoving.
Alfred R. Anderson.

Inventor:
Wilhelm Kieling
by W. H. Berrigan,
Attorney.

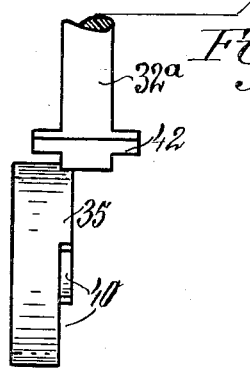
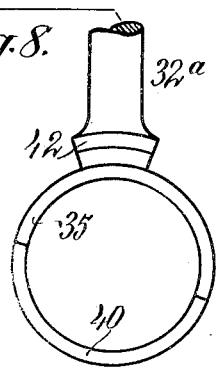
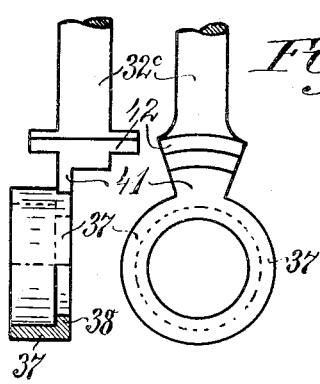
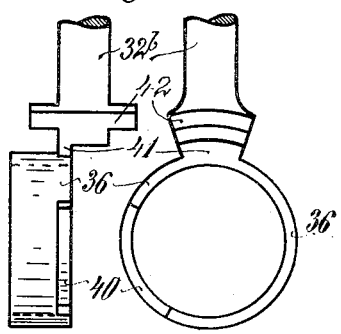
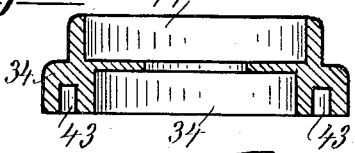
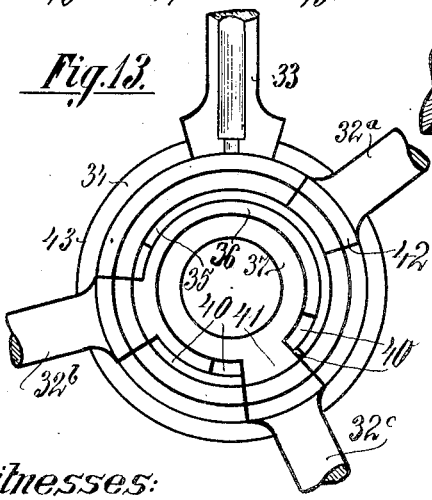
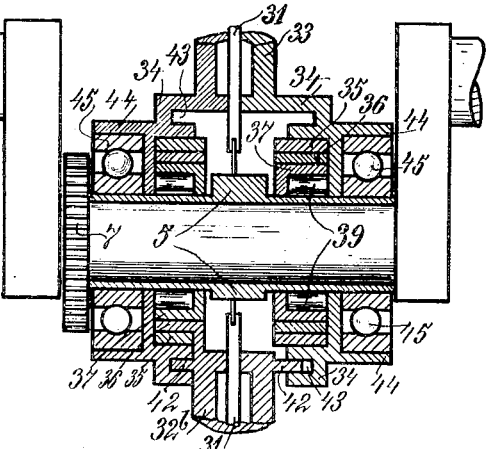

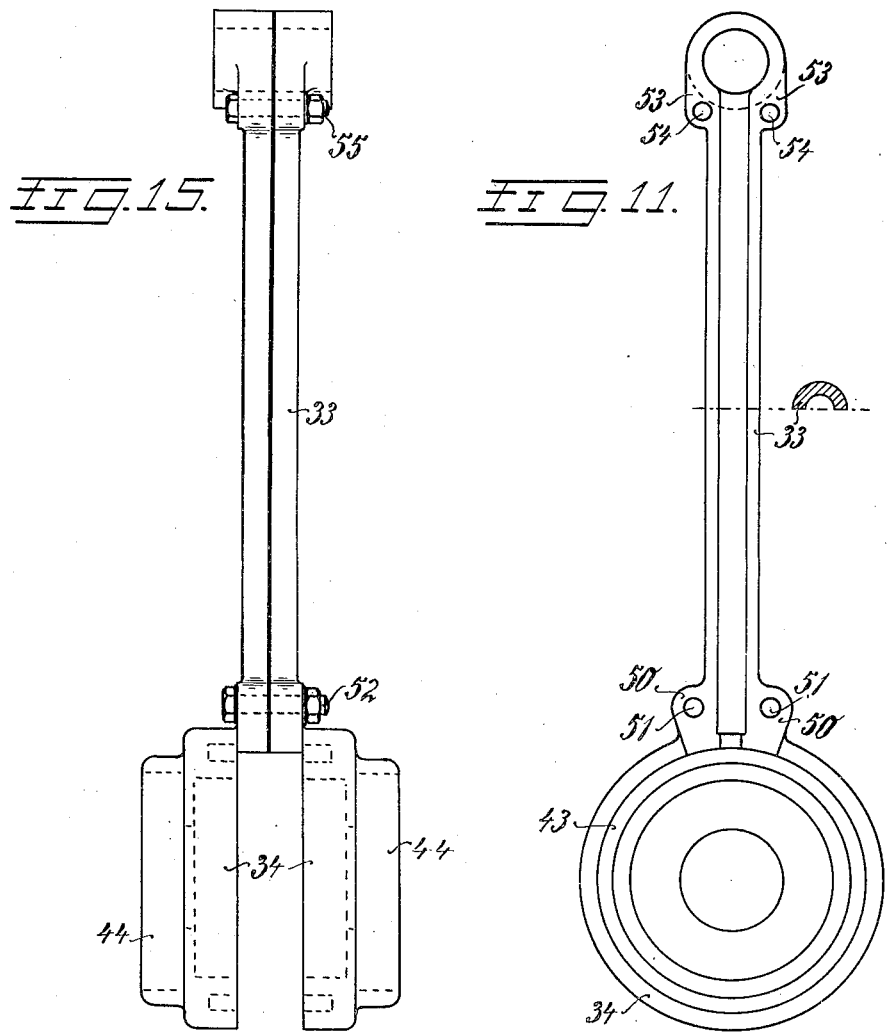

UNITED STATES PATENT OFFICE.

WILHELM KIELING, OF FRANKFORT-ON-THE-MAIN, GERMANY.

INTERNAL-COMBUSTION ENGINE WITH ROTATING CYLINDERS.

1,191,437.                    Specification of Letters Patent.     Patented July 18, 1916.

Application filed August 20, 1912. Serial No. 716,037.

*To all whom it may concern:*

Be it known that I, WILHELM KIELING, a subject of the German Emperor, residing at Frankfort-on-the-Main, Germany, have invented new and useful Improvements in Internal-Combustion Engines with Rotating Cylinders, of which the following is a specification.

This invention relates to improvements in internal combustion engines with rotating cylinders and has for its object to provide an engine that is small, light and effective and that may easily be dismounted or assembled.

With these objects in view my invention consists in an improved construction of the casing, the cylinders, the connecting rod ends, and in the combination and arrangement of parts hereinafter fully described and claimed, reference being had to the accompanying drawings, in which:—

Figure 7:
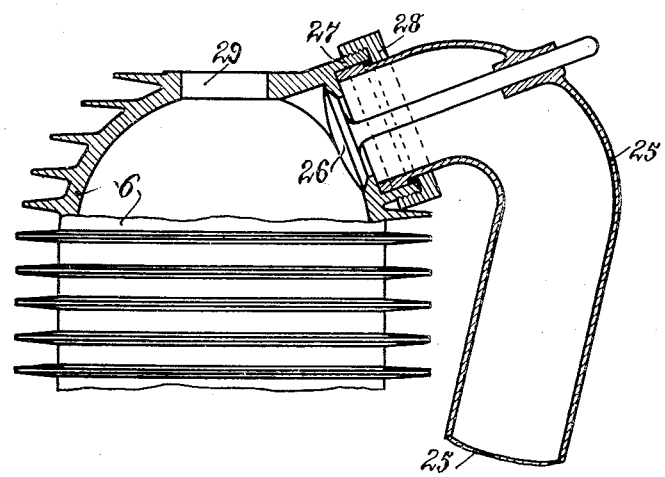
Figure 3:
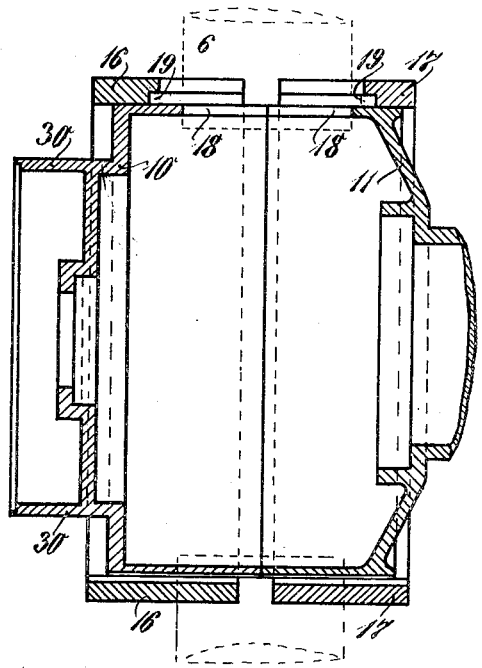
Figure 2:
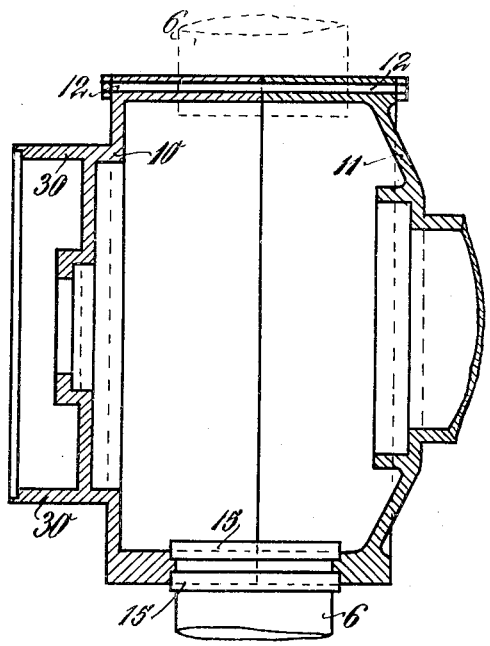

Figure 1 is a longitudinal section through the internal combustion engine, parts being broken away, and parts being shown in elevation. Fig. 2 is a section through the casing. Fig. 3 is a section through a modified form of the casing. Fig. 4 is a section through the contacting parts of two adjacent cylinders, partly broken away. Fig. 5 is a view of Fig. 4 taken from below. Fig. 6 shows the gearing for actuating the cam-sleeve. Fig. 7 is a section through the outlet valve. Figs. 8, 9, 10 are separate connecting rods in views at right angles to one another. Fig. 11 shows one half of the main connecting rod with bush. Fig. 12 is a section through the bush according to Fig. 11. Fig. 13 represents an elevation of one group of connecting rod ends united in the bush of the one half of the main connecting rod. Fig. 14 is a section through the connecting rod ends and shows in a larger scale the arrangement of the connecting rod ends in two groups on the crank pin. Fig. 15 shows the two halves of the main connecting rod secured together.

The hollow crank shaft 1 about which the casing 2 rotates and through which the fuel is fed to the cylinders, carries the crank pin 3, rotatably mounted on which is a sleeve 4 having cams 5 for the actuation of the inlet valves (not represented) arranged in the pistons of the cylinders 6. The sleeve 4 is connected with a pinion 7 meshing with a pinion 8 which is carried by the crank, as shown in Fig. 6, and is driven by a pinion 9 mounted in the hollow crank shaft portion 1$^\times$ and is connected with the casing 2 so that the latter in rotating rotates the cams 5. The ratio of the gears may be 1:2 or 6:7 as suitable.

As shown the casing 2 consists only of two portions 10 and 11 which are connected with one another by bolts 12. Said bolts engage in lateral recesses 13 (Fig. 4) of the cylinders 6 preventing the same from rotating about their axis. For the same purpose the cylinders are provided with flat faces 14 at the contacting edges of their open end. The cylinders, furthermore, are formed with collars 15 adapted to engage in corresponding grooves in both halves of the casing, as shown in Fig. 2.

For the purpose of assembling or dismounting the cylinders 6, only the two parts of the casing require to be brought together or taken apart while the gearings for actuating the valves as well as the heads or ends of the connecting rods are not affected. To further simplify the mounting of the cylinders the parts 10 and 11 of the casing may carry rings 16 and 17, respectively, and are provided only with recesses 18 for the insertion of the open end of the cylinders loosely engaged in the two-part-casing on which they rest with their collars 15. The rings 16 and 17 are fitted with grooves 19 to extend over the cylinder collars 15 when the rings are connected with one another by the said bolts 12. To remove the cylinders 6 from the casing only the rings 16 and 17 require to be separated, as represented in Fig. 3, without releasing the halves of the casing so that the elements arranged in the same are not to be affected.

The part 10 of the casing carries an annular projection 30 adapted to be engaged by a suitable cover 20 (Fig. 1) inclosing the actuating gear (not shown) for the outlet valves. Said projection is adapted to be connected with the open end of a pointed silencer 21 which is divided by a perforated wall 22 into a closed chamber 23 and a chamber 24 connected with the atmosphere by means of small holes arranged in the walls. Into the closed chamber 23 extend pipes 25 from the outlet valves 26 (Fig. 7), the sockets 27 of said outlet valves being arranged rearward relatively to the direction of rotation of the engine so that the gases pass tangentially out of the cylinders, thereby accelerating the exhaust movement of the gases burnt and assisting the rotation of the engine if the pipes 25 are removed in case the engine is acting without the silencer. To enable an easy removal of the pipes 25 they are secured by means of screw caps 28 to the valve sockets 27 of the cylinders 6. In arranging the outlet valves rearward with respect to the direction of rotation of the cylinders the middle 29 of the closed end of the same, hitherto taken by the outlet valve, is open for the insertion of the sparking plug. In such a way the sparking takes place in the center of the gases to be burnt insuring effective explosions of the gases thrown toward the closed end of the cylinders by the centrifugal action of the rotation.

As said, the inlet valves are arranged in the pistons and are operated by the spindles 31 inserted into the connecting rods 32 from cams 5 which are driven as explained above. The connecting rods having ring shaped ends are connected to the crank pin as hereinafter set forth. If the engine has seven cylinders, as is assumed in the case illustrated, the connecting rods are divided into two groups of three each and a main connecting rod 33, which is divided longitudinally and each half of the same is connected with a bush 34 (Figs. 11 and 12) in which the annular ends of the connecting rods forming one group are concentrically arranged (Fig. 13). The connection between the rod 33 and the bush 34 is enlarged as shown at 50 (Fig. 11) and is provided with holes 51 adapted to be engaged by screw bolts 52 (Fig. 15). The opposite end of the main connecting rod, through which the bolt of the piston is fitted, is provided with an enlargement 53 with holes 54 adapted to be engaged by screw bolts 55, as will be seen in Fig. 15. 43 is an annular slot into which the enlarged ends of the other connecting rods fit.

44 is an annular flange adapted to be engaged by the ball bearings 45 (Fig. 14).

Into the bush 34 the ring 35 of the connecting rod 32$^a$ (Fig. 8) is first inserted. Into this ring is fitted the ring 36 of the rod 32$^b$ (Fig. 9) and into the same the ring 37 (Fig. 10) of the connecting rod 32$^c$. The ring 37 is provided with a flange 38 for the insertion of a roller bearing 39 (Figs. 1 and 14). The rings 35 and 36 are formed with recesses 40 to permit the crosspieces or webs 41 arranged between the ring 37 and its rod 32$^c$ and between the ring 36 and its rod 32$^b$ to move therein. To take up the pressure of explosion laterally projecting extensions 42 are provided on each connecting rod 32 which extensions slide in annular grooves 43 in both bushes (see the connecting rod 32$^b$ in Fig. 14). After each group of connecting rod is inserted into a bush 34 both bushes and therewith the halves of the main connecting rod 33 are connected with one another, for instance by means of bolts screwed through the halves of the main connecting rod. The extensions 42 of the connecting rods 32 within one bush thereby engage in the groove 43 of the other bush and vice versa. The bushes also carry an annular extension 44 for ball bearings 45.

What I claim is:—

1. In an internal combustion engine, the combination of a rotary casing having two parts provided with semi-circular recesses coöperating to form circular recesses in the casing; cylinders engaging in said recesses, the successive cylinders being provided at their inner ends with contacting flat faces; and means for holding the cylinders in said recesses.

2. In an internal combustion engine, the combination of a rotary casing having two parts provided with semi-circular recesses coöperating to form circular recesses in the casing; cylinders engaging in said recesses, the successive cylinders being provided at their inner ends with contacting flat faces; and coöperating grooves; and bolts passing through said grooves and engaging said parts.

3. In an internal combustion engine, the combination of a rotary casing having two parts provided with semi-circular recesses coöperating to form circular recesses in the casing; a ring slipped over each part of the casing and provided with recesses registering with the recesses of the casing, annular grooves being provided at the meeting lines of said recesses of the casing and the rings; and cylinders fitting on said recesses and provided with annular ribs engaging in said grooves.

4. In an internal combustion engine, the combination of a rotary casing having two parts provided with semi-circular recesses coöperating to form circular recesses in the casing; a ring slipped over each part of the casing and provided with recesses registering with the recesses of the casing, annular grooves being provided at the meeting lines of said recesses of the casing and the rings; cylinders fitting on said recesses and provided with annular ribs engaging in said grooves, and with flat faces engaging the adjacent flat faces of the succeeding cylinders and provided with coöperating grooves forming a bore; and bolts passing through said bore.

5. In an internal combustion engine, the combination of a rotary casing having two parts provided with semi-circular recesses coöperating to form circular recesses in the casing; a ring slipped over each part of the casing and provided with recesses registering with the recesses of the casing, annular grooves being provided at the meeting lines of said recesses of the casing and the rings;

cylinders fitting in said recesses and provided with annular ribs engaging in said grooves, and with flat faces, the flat faces of each cylinder engaging the flat faces of the adjacent cylinders and provided with coöperating grooves forming a bore; and bolts passing through said bore and engaging said parts of the casing and the rings.

6. In an internal combustion engine, the combination of a rotary casing; radially arranged cylinders carried thereby and provided with outlet valves in their rear walls near their outer ends; a silencer removably mounted on the front end of the casing and provided with perforated walls and a perforated transverse partition providing a rear compartment; and detachable pipes leading from said valves to said rear compartment.

7. In an internal combustion engine, the combination of a rotary casing, cylinders arranged radially thereon, each provided in its rear wall near the outer end with an outlet valve disposed rearwardly with relation to the rotation of the engine and remote from the axis of the cylinder, a pointed silencer removably mounted on the front end of the casing and provided with perforated walls and a perforated transverse partition providing a rear compartment and detachable pipes leading from said valves to said rear compartment.

8. In an internal combustion engine, the combination of a rotary casing, cylinders arranged radially thereon, each provided in its rear wall near the outer end with an outlet valve disposed rearwardly with relation to the rotation of the engine and remote from the axis of the cylinder, a silencer removably mounted on the front end of the casing and provided with perforated walls and a perforated transverse partition providing a rear compartment, detachable pipes leading from said valves to said rear compartment, a crank shaft in the casing, a piston rod for each cylinder and cams on the crank for operating inlet valve spindles inserted into the piston rod.

In testimony whereof I affix my signature in presence of two witnesses.

WILHELM KIELING.

Witnesses:
ALFRED KATTS,
JEAN GRUND.